April 18, 1967  G. O. EBREY  3,314,768
PHOTOCHEMICAL REACTOR
Filed April 19, 1965

INVENTOR
G. O. EBREY
BY
ATTORNEYS

United States Patent Office 3,314,768
Patented Apr. 18, 1967

3,314,768
PHOTOCHEMICAL REACTOR
Glenn O. Ebrey, Copan, Okla., assignor to Phillips Petroleum Company, a corporation of Delaware
Filed Apr. 19, 1965, Ser. No. 449,144
2 Claims. (Cl. 23—285)

This invention relates to apparatus for reacting chemicals. In one aspect this invention relates to apparatus for photochemical reactions.

Heretofore, the use of baffles and/or stirring apparatus in a light-catalyzed reactor system have been held to an absolute minimum if used at all because of the difficulty of flooding the interior of the reactor with light when such apparatus is also present.

It has now been found that both baffles and a stirring apparatus can be employed in a photochemical reactor without hindering the permeation of the interior of the reactor with light if opposite ends of the reactor are closed by transparent plates and a baffle means comprising an apertured member having two plates or legs extending substantially at right angles from opposite ends of the apertured member and in opposite directions is mounted in the container in a manner such that the two legs are held to opposite sides of the container so that the transmittal of the fluid from one transparent plate end of the container to the other transparent plate end can be effected only by passage through the aperture in the apertured member. A stirring or agitating means can extend into or through the aperture in the apertured member of the baffle and light means can be positioned adjacent both transparent plates. Thus, by this invention due to the presence of both a baffle and stirring means very intimate mixing of the contents of the container is achieved while exposing substantially the entire interior of the container to light or other similar catalytic media.

Although somewhat similar apparatus has been employed in the use of in-line blenders, Chemical Engineering, volume 71, No. 12, June 8, 1964, page 215, the above apparatus as further described below additionally presents an extremely efficient means for effecting light catalyzed reactions without sacrificing or unduly limiting the use of baffles and stirring means to effect intimate mixing of the reactants during the reaction. The flow of reactants through the reactor is circuitous, the reactants being introduced into one side of the container adjacent a transparent plate and having to travel along one plate or leg of the baffle, turn a corner, pass by an agitating means through the aperture in the baffle, pass a second agitating means, turn about a second corner of the baffle and pass along the full length of a second plate or leg to the exit conduit of the container. Thus, the flow of reactants is quite distinct, extremely beneficial to the reaction and substantially completely exposed to the catalytic media at all times. The reactants are given a high degree of mixing and exposure to light rays. This results in a substantially complete conversion in a relatively short time and in a very compact reactor.

Accordingly, it is an object of this invention to provide a new and improved chemical reaction apparatus. It is another object of this invention to provide a new and improved photochemical reactor.

Other aspects, objects and the several advantages of the invention will be apparent to those skilled in the art from the description, the drawing and the appended claims.

Figure 1:
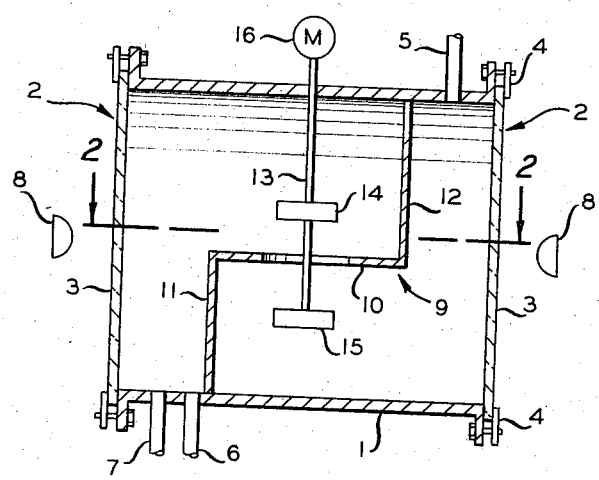
FIGURE 1 is a cross-sectional view of a reactor employing the concepts of this invention.

Referring to FIGURE 1 there is shown a reactor 1 which can be of any desirable configuration such as cylindrical, square, rectangular, and the like, having opposite ends 2 covered by transparent plates 3. The transparent plates can be of any suitable composition such as glass, quartz, and the like. Plates 3 can be permanently fixed to container 1 or, preferably, for ease of maintenance and cleaning, the plates can be removably fixed to container 1 by any suitable means such as a bolted flange or other screw means 4. Container 1 has on opposite sides thereof conduit means 5, 6 and 7 openly connected to the interior thereof for the admission of one or more reactants and the removal of the reaction product and associated materials. Conduits 6 and 7 are provided for the introduction of two separate reactants if their chemical reactivity is such that they cannot be mixed prior to introduction into the reactor. Of course, a single conduit can be employed in lieu of conduits 6 and 7 if desired. Light means 8 is mounted adjacent either plate 3 and provides the catalytic media for the interior of reactor 1 while the reaction is taking place.

In the interior of reactor 1 is baffle 9 which is composed of an apertured member 10 and two legs 11 and 12. Legs 11 and 12 are coextensive with the outer perimeter of the sides of container 1 into which they are sealed so that a fluid entering through conduit 6 and/or 7 can only pass through the aperture in apertured member 10 in order to reach exit conduit 5. Although legs 11 and 12 are shown to extend substantially at a right angle to apertured member 10, it is to be noted that they can extend at any desired acute or obtuse angle relative to apertured member 10. Thus, when the legs are referred to as extending at substantially right angles to apertured member 10, legs meeting apertured member 10 at acute and/or obtuse angles are also included. A shaft 13 is rotatably carried by container 1 and has mounted thereon, on either side of apertured member 10, paddles or other similar stirring means 14 and 15. Shaft 13 is rotated by motor 16. The configuration of the aperture in member 10 can be circular, rectangular, square or any other desired shape, the primary requirements being that the size and shape is sufficient to allow passage of a sufficient volume of fluid therethrough to meet the capacity desired of the reactor. Any conventional type of stirring apparatus can be employed but a preferred apparatus is that as shown in FIGURE 1, it being desired to have mechanical agitation in both chambers of container 1. Stirring means 14 can be attached to shaft 13 after shaft 13 is extended through the wall of container 1 and stirring means 15 may be attached to shaft 13 after shaft 13 has been extended through the aperture in member 10.

Figure 2:
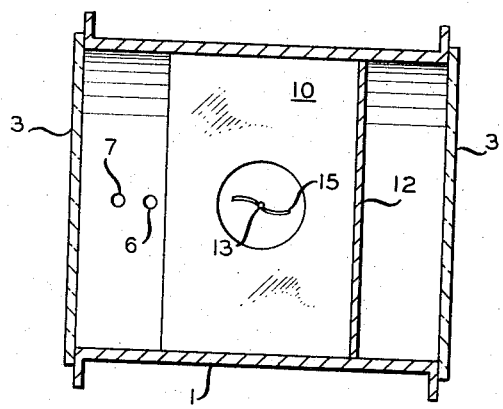
FIGURE 2 is a plan view taken along the line II—II of the reactor of FIGURE 1.

In FIGURE 2 there is shown container 1 with transparent plates 3 on either end thereof and conduits 6 and 7 in the bottom thereof. There is also shown the top of apertured member 10 and a cross section of leg 12. Shaft 13 extends through the aperture in apertured member 10 and supports paddles 14 and 15.

The use of additional baffle and/or stirring means on legs 11 and 12 or on the sides of container 1 can be employed in order to effect greater turbulence of the fluid passing therethrough.

Example

About 7,264 pounds per day of butadiene at ambient temperature and a 100° F. mixture of about 138 pounds per day of iodine and about 2,622 pounds per day of toluene are admitted to the interior of the reactor similar to that shown in FIGURE 1. The reactor has a 4-gallon capacity and the size of the conduits and aperture in apertured member 10 is adjusted to give a residence time of from 4 to 5 minutes. The stirring means is rotated at about 1,750 revolutions per minute. Two 400-watt mercury vapor lamps are positioned adjacent a glass plate at either end of the reactor. About 167 pounds per day of diiodobutene is formed in the reactor.

Reasonable variations and modifications are possible within the scope of this disclosure without departing from the spirit and scope thereof.

I claim:

1. Reactor apparatus comprising a hollow container having opposite ends closed by transparent plates, a baffle means in said container comprising an apertured member, a first plate extending substantially at a right angle to and from one end of said apertured member, a second plate extending substantially at a right angle to and from the opposite end of said apertured member, said second plate extending at a direction opposite to said first plate, said first plate being sealed to one side of said container and said second plate being sealed to the opposite side of said container in a manner such that the transmittal of a fluid from one transparent plate end of said container to the other transparent plate end can be effected substantially only by passage through the aperture in said apertured member, a shaft rotatably carried by said container and extending through said aperture in said apertured member, at least two paddle means mounted on said shaft, said paddle means being disposed on either side of said apertured member, means to rotate said shaft, and conduit means openly connected to opposite sides of said container adjacent the area at which said baffle legs are sealed to said container and between said baffle legs and said transparent plates.

2. Photochemical reaction apparatus comprising a horizontally disposed hollow container having opposite and vertical ends sealed by transparent plates, a baffle means in the interior of said container comprising a horizontal, apertured member, a substantially vertical first leg sealed to the bottom of said container and to one end of said apertured member, a second substantially vertical leg sealed to the top of said container and to the opposite end of said apertured member, said first and second legs being coextensive with the periphery of said bottom and top of said container and said sealing being effected in a manner such that the transmittal of a fluid from one transparent plate end of said container to the other transparent plate end can be effected only by passage through the aperture in said horizontal, apertured member, a shaft rotatably carried by said container and extending through said aperture in said apertured member, at least two paddle means mounted on said shaft, said paddle means being disposed at least one on the top side and at least one on the bottom side of said apertured member, means to rotate said shaft, and at least one conduit means openly connected to the bottom and at least one conduit means openly connected to the top of said container, said conduit means being openly connected to the interior of said container between said baffle legs and said transparent plates.

No references cited.

MORRIS O. WOLK, *Primary Examiner.*

J. H. TAYMAN, *Assistant Examiner.*